United States Patent
Ohkoba (10) Patent No.: US 10,831,086 B2
(45) Date of Patent: Nov. 10, 2020

(54) LIGHT SOURCE APPARATUS AND IMAGE PROJECTION APPARATUS

(71) Applicant: CANON KABUSHIKI KAISHA, Tokyo (JP)

(72) Inventor: Minoru Ohkoba, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/364,970

(22) Filed: Mar. 26, 2019

(65) Prior Publication Data

US 2019/0302590 A1 Oct. 3, 2019

(30) Foreign Application Priority Data

Apr. 2, 2018 (JP) .................... 2018-070587

(51) Int. Cl.
*G03B 21/20* (2006.01)
(52) U.S. Cl.
CPC ....... *G03B 21/204* (2013.01); *G03B 21/2073* (2013.01)
(58) Field of Classification Search
CPC ............. G03B 21/204; G03B 21/2013; G03B 21/2033; G03B 21/2053; G03B 21/2073; F21V 9/06; F21V 9/08; F21V 9/14; F21V 9/30
See application file for complete search history.

(56) References Cited

U.S. PATENT DOCUMENTS

| | | | |
|---|---|---|---|
| 2013/0135558 A1* | 5/2013 | Kim ................. | G02F 1/133528 349/62 |
| 2015/0362728 A1* | 12/2015 | Tei ...................... | G02B 5/3033 353/20 |
| 2017/0097560 A1* | 4/2017 | Matsubara ........... | G02B 27/123 |
| 2017/0244939 A1* | 8/2017 | Arakawa .............. | G03B 21/204 |
| 2018/0081242 A1* | 3/2018 | Yoon .................. | G02F 1/13362 |
| 2018/0217486 A1* | 8/2018 | Tanaka ................ | G02B 27/283 |

FOREIGN PATENT DOCUMENTS

| | | |
|---|---|---|
| JP | 2012137744 A | 7/2012 |
| JP | 2015106130 A | 6/2015 |
| JP | 2016145881 A | 8/2016 |
| JP | 2017129733 A | 7/2017 |

\* cited by examiner

*Primary Examiner* — Sultan Chowdhury
(74) *Attorney, Agent, or Firm* — Carter, DeLuca & Farrell LLP (57) ABSTRACT

The light source apparatus includes a light source and a wavelength conversion element containing quantum rods capable of converting a first linearly polarized light from the light source into a second linearly polarized light whose wavelength is different from that of the first linearly polarized light3. The apparatus further includes a changer configured to change a polarization direction of the first linearly polarized light entering the quantum rods.

6 Claims, 6 Drawing Sheets

EVALUATION RESULT

| | INPUT | STATE | OUTPUT | | RESULT |
| | LD EXCITATION LIGHT | POLARIZATION RELATIVE ANGLE | RELATIVE INTENSITY [a.u.] | | |
| | | | NON-CONVERTED LIGHT | CONVERTED LIGHT | COLOR BALANCE |
|---|---|---|---|---|---|
| STATE1 | 100W | 0° | 100 | 80 | OK |
| STATE2 | 50W | 0° | 50 | 50 | NG |
| STATE3 | 50W | 15° | 55 | 44 | OK |

LIGHT SOURCE APPARATUS AND IMAGE PROJECTION APPARATUS

BACKGROUND OF THE INVENTION

Field of the Invention

The present invention relates to a light source apparatus using a wavelength conversion element and being suitable for image projection apparatuses (projectors).

Description of the Related Art

Projectors includes, as disclosed in Japanese Patent Laid-Open No. 2012-137744, one that introduces an excitation light from a light source to a fluorescent body to cause it to emit a fluorescent light (wavelength-converted light), and that uses a combined light including the fluorescent light and a non-converted light which is not converted to the fluorescent light in the excitation light to project and display an image. Japanese Patent Laid-Open No. 2015-106130 discloses a projector including a mechanism for controlling a balance of the excitation light and the fluorescent light in order to reduce variation in color of the fluorescent light (or of the combined light including the fluorescent and non-converted lights) due to variation in conversion efficiency of the fluorescent body depending on an intensity of the fluorescent light.

However, the projector disclosed in Japanese Patent Laid-Open No. 2015-106130 requires a first optical member for separating the excitation light into two lights and a second optical member for providing a reflective diffusing point at a position whose distance is equal to that from the first optical member to the fluorescent body and which thereby is optically conjugate with respect to the fluorescent body. Thus, this projector includes a lot of constituent parts.

SUMMARY OF THE INVENTION

The present invention provides a light source apparatus capable of controlling a light amount ratio of an excitation light and a fluorescent light with a small number of constituent parts, and provides an image projection apparatus using the light source apparatus.

The present invention provides as an aspect thereof a light source apparatus including a light source, a wavelength conversion element containing quantum rods capable of converting a first linearly polarized light from the light source into a second linearly polarized light whose wavelength is different from that of the first linearly polarized light, and a changer configured to change a polarization direction of the first linearly polarized light entering the quantum rods.

The present invention provides as another aspect thereof an image projection apparatus including the above light source apparatus.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Figure 7:
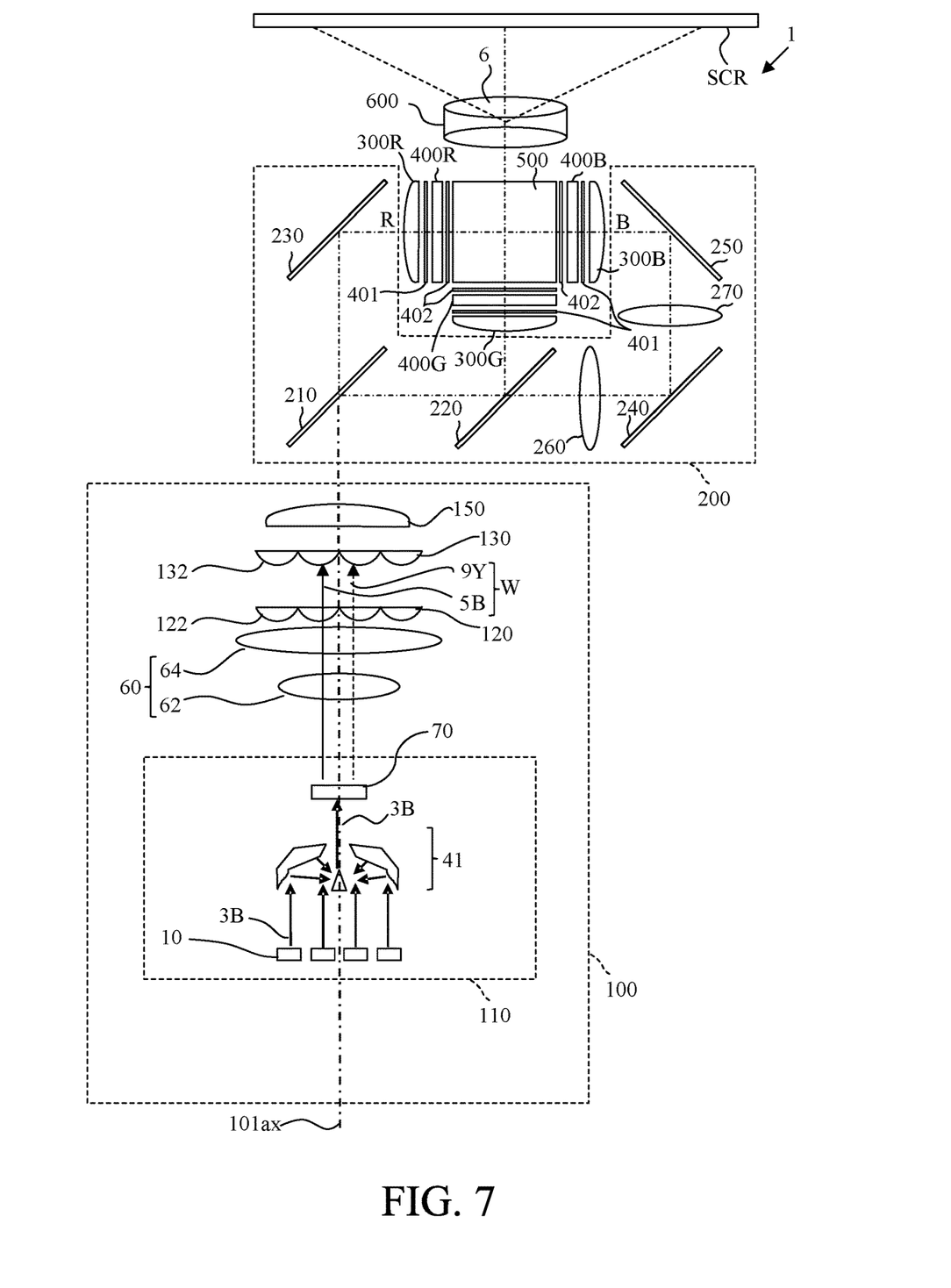
FIG. 7 illustrates a configuration of an optical system of a projector that is an embodiment of the present invention.

FIG. 7 illustrates a configuration of a projector 1 as an image projection apparatus including a light source apparatus that will be described in following Embodiments 1 to 5. The projector 1 modulates, depending on a video signal input from an outside source, a red light, a green light and a blue light by three light modulators 400R, 400G and 400B provided for the respective color lights, and projects the modulated color lights onto a screen (projection surface) SCR to display a color video image. The projector 1 includes an illumination unit 100, a color separation optical system 200, the light modulators 400R, 400G and 400B, a color combination optical system (cross dichroic prism) 500 and a projection optical system 600.

The illumination unit 100 includes a laser diode (LD) light source 10, a collective optical system 41, a collimator optical system 60, a wavelength conversion element 70, a first lens array 120, a second lens array 130 and a superposition lens 150. The LD light source 10, the collective optical system 41 and the wavelength conversion element 70 constitute a light source unit 110 as the light source apparatus.

The LD light source 10 includes multiple LDs arrayed in a plane orthogonal to an optical axis (hereinafter referred to as "an illumination optical axis") 101ax of the illumination unit 100.

Each LD emits a blue laser light that is used as an excitation light 3. The blue laser light is a linearly polarized light (first linearly polarized light) having a predetermined polarization direction, and its wavelength (first wavelength) at which its emission intensity becomes a peak is approximately 445 nm.

The LD light source 10 may use LDs each emitting a blue laser light whose wavelength is other than 455 nm (for example, 460 nm), and may use LDs each emitting an ultraviolet light. Moreover, the projector 1 may use a light source including a light emitting element other than the LD as long as the light emitting element emits a linearly polarized light.

On a light entrance side further than each of the light modulators 400R, 400G and 400B, an entrance polarizer 401 is disposed. On the other hand, on a light exit side further than each of the light modulators 400R, 400G and 400B, an exit polarizer 402 is disposed. Each of the light modulators 400R, 400G and 400B is constituted by a transmissive liquid crystal element. The projector may use, as the light modulator, a reflective liquid crystal element or a digital micromirror device. In this case, since the light entrance side and the light exit side of the light modulator are equal to each other, a proper optical system (not illustrated) that separates an entrance optical path into two optical paths.

The collective optical system 41 is constituted by multiple mirrors, and reduces a light flux diameter of the multiple blue laser lights emitted from the LD light source (LDs) 10.

The collective optical system may be constituted by one or more lenses instead of the mirrors.

The wavelength conversion element 70 wavelength-converts a part of the excitation light 3 as the linearly polarized light emitted from the LD light source 10 to generate a converted light 9, and emits a white light including the converted light 9 and a non-converted light that is not converted in the excitation light 3 by the wavelength conversion element 70. In this embodiment, the wavelength conversion element 70 uses fluorescent bodies or quantum dots (including quantum rods) for wavelength conversion of the excitation light 3 from the JD light source 10. The light exiting from the light source unit 110 may be a light other than the white light.

The wavelength conversion element 70 in this embodiment wavelength-converts the part of the excitation light 3 as the blue laser light into the converted light 9 as a yellow light (green and red lights). Conventional typical wavelength conversion elements are produced by dispersing oxide fluorescent body powder in an Si resin and putting this Si resin on a transparent (light transmissive) substrate or a light reflective substrate formed of metal. This embodiment uses, as the wavelength conversion element 70, an element produced by putting the Si resin in which the oxide fluorescent body powder is dispersed on the transparent substrate. The transparent substrate may be a sapphire substrate having a high heat conductivity or a glass substrate. As the light reflective substrate, an Al substrate, a cupper substrate or the like may be used. The wavelength conversion element 70 may be a fixed one that is not rotatable or may be a rotatable one having a circular disc shape. The rotatable wavelength conversion element 70 makes it possible to reduce an entering amount of the excitation light per unit area of the wavelength conversion element 70 and to provide an enough heat radiation area. As long as having an enough heat tolerability for the entering excitation light and emitting a desired white light, the wavelength conversion element 70 may be the fixed one. This embodiment uses, as the wavelength conversion element 70, the fixed one.

Moreover, the wavelength conversion element 70 in this embodiment includes, as a wavelength conversion portion, a quantum rod layer. The quantum rod layer is formed by mixing quantum rods 52 into a binder 51 formed of an organic film and by stretching it. Each quantum rod is a rod-shaped particle of a compound semiconductor such as CdSe, GaAs and GaN, and has a size from several to tens of nanometers. Each quantum rod wavelength-converts the entering excitation light into a converted light as a fluorescent light, and emits the converted light. This function of the quantum rod is the same as that of the fluorescent body and the quantum dot. However, the quantum rod is different from the quantum dot in that it has conversion efficiency depending on an entering light's polarization direction and emits a linearly polarized light (second linearly polarized light) as the converted light.

The collimator optical system 60 includes a first collimator lens 62 and a second collimator lens 64 to convert a divergent light flux (white light) from the wavelength conversion element 70 into a collimated light flux. The first and second collimator lenses 62 and 64 are both convex lenses.

The first lens array 120 includes multiple first lens cells 122 arrayed in a matrix in a plane orthogonal to the illumination optical axis 101$ax$. The multiple first lens cells 122 divide the light flux from the collimator optical system 60 into multiple light fluxes. The second lens array 130 includes multiple second lens cells 132 corresponding respectively to the multiple first lens cells 122 and arrayed in a matrix in another plane orthogonal to the illumination optical axis 101$ax$. The multiple second lens cells 132 form, with the superposition lens 150, multiple optical images of the multiple first lens cells 122 on modulation surfaces of the light modulators 400R, 400G and 400B. The superposition lens 150 condenses the multiple light fluxes from the second lens array 130, and superposes the multiple light fluxes with one another on the modulation surfaces. The first lens array 120, the second lens array 130 and the superposition lens 150 constitute an integrator optical system that uniforms an intensity distribution of the light from the wavelength conversion element 70.

The color separation optical system 200 includes dichroic mirrors 210 and 220, reflective mirrors 230, 240 and 250, and relay lenses 260 and 270. The color separation optical system 200 separates the white light from the illumination optical system 100 into the red light, the green light and the blue light and introduces the red light, the green light and the blue light to the corresponding light modulators 400R, 400G and 400B. Between the color separation optical system 200 and the light modulators 400R, 400G and 400B, collective lenses 300R, 300G and 300B are disposed. The dichroic mirror 210 transmits the red light, and reflects the green and blue lights. The dichroic mirror 220 transmits the green light, and reflects the blue light.

The reflective mirror 230 reflects the red light. The reflective mirrors 240 and 250 reflect the blue light. The red light transmitted through the dichroic mirror 210 is reflected by the reflective mirror 230, is collected by the collective lens 300R, and then reaches the modulation surface of the light modulator 400R for the red light. The green light reflected by the dichroic mirror 210 is further reflected by the dichroic mirror 220, is collected by the collective lens 300G, and then reaches the modulation surface of the light modulator 400G for the green light. The blue light transmitted through the dichroic mirror 220 proceeds via the relay lens 260, the reflective mirror 240 and the relay lens 270 to the reflective mirror 250, is collected by the collective lens 300B, and then reaches the modulation surface of the light modulator 400B for the blue light.

The cross dichroic prism 500 combines the modulated red, green and blue lights from the light modulators 400R, 400G and 400B (these modulated lights are hereinafter collectively referred to as "an image light"), and introduces the image light to the projection optical system 600. The projection optical system 600 projects the image light from the cross dichroic prism 500 on the screen SCR, and thereby an enlarged image is displayed (projected).

The wavelength conversion element 70 has a conversion efficiency that is not constant with respect to an input energy of the excitation light but deceases as the input energy increases. Such a phenomenon of the wavelength conversion element 70 is called a conversion saturation phenomenon. Especially in projectors, in order to improve a contrast of the projected image, the wavelength conversion element is used with increasing and decreasing intensity of the excitation light by output control of the LD light source. This changes the conversion efficiency of the wavelength conversion element, and thereby changes a balance of amounts of the converted light and the non-converted light from the wavelength conversion element. This results in variation in color of the white light emitted from the light source unit 110, which causes a color shift (color variation) in the projected image.

Moreover, the variation in color of the white light is caused not only due to the conversion saturation phenomenon of the wavelength conversion element, but also due to deterioration of the LD light source and others. The following specific embodiments of the light source unit 110 reduce the variation in color of the white light from the light source unit 110 which is caused due to these causes.

[Embodiment 1]

Figures 1A, 1B:
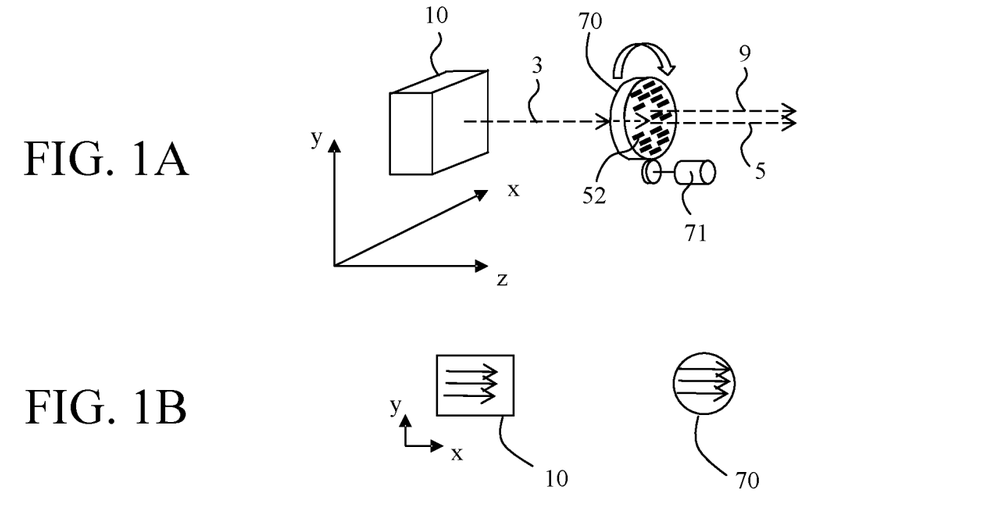
FIGS. 1A to 1C illustrate a configuration of a light source unit that is Embodiment 1 of the present invention.

FIGS. 1A to 1C illustrate a configuration of the light source unit 110 that is a first embodiment (Embodiment 1). In FIG. 1A, constituent elements identical to those illustrated in FIG. 7 are denoted by the same reference numerals as those in FIG. 7. The LD light source 10 emits an excitation light 3 as a linearly polarized light (first linearly polarized light) having a specific polarization direction (x direction). The excitation light 3 enters the wavelength conversion element 70. The fixed wavelength conversion element 70 is rotatable to a set rotation position to change a longitudinal direction of the quantum rods. As shown by an arrow in FIG. 1B, the wavelength conversion element 70 is rotated to a set rotation position where the longitudinal direction of the quantum rods becomes a horizontal direction (x direction), that is, the same direction as the polarization direction of the excitation light. At this set rotation position, the conversion efficiency of the wavelength conversion element 70 becomes high.

Figure 1C:
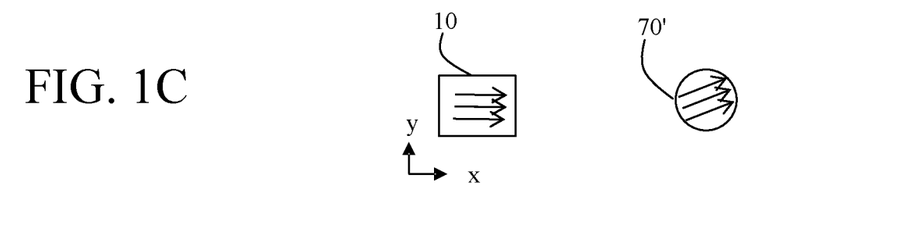

A wavelength conversion element 70' illustrated in FIG. 1C is rotated to a set rotation position where the longitudinal direction (arrow direction) of the quantum rods becomes a direction inclined with respect to the x direction. At this set rotation direction, since the longitudinal direction of the quantum rods is different from the polarization direction of the excitation light, the conversion efficiency of the wavelength conversion element 70 decreases further than the case illustrated in FIG. 1B. As just described, the light source unit 110 in this embodiment has a rotation mechanism 71 as a changer that rotates the wavelength conversion element 70 to change the polarization direction of the first linearly polarized light entering the quantum rods.

When the output of the LD light source 10 decreases due to the conversion saturation phenomenon of the wavelength conversion element 70 or the deterioration of the LD light source 10, the wavelength conversion element 70 is rotated by the rotation mechanism 71 from the rotation position of FIG. 1B to the rotation position of FIG. 1C (or another position not illustrated). The rotation of the wavelength conversion element 70 makes it possible to change the conversion efficiency of the wavelength conversion element 70 and thereby to control the balance of the amounts of the converted light 9 and the non-converted light (that is, the color of the white light) from the wavelength conversion element 70.

In Embodiment 1 and the following other embodiments, it is necessary that the quantum rods in the wavelength conversion element 70 be arranged, in order to have a directional characteristic of the conversion efficiency to the entering linearly polarized light, so as to have directionality in a specific direction in the wavelength conversion element 70. This is because the quantum rods arranged randomly in the wavelength conversion element do not have directionality to the linearly polarized light. On this premise, it is only necessary to rotate at least one of the LD light source 10, the wavelength conversion element 70 and a half-wave plate (described in Embodiment 3) with respect to the others or other thereof so as to change the polarization direction of the entering excitation light.

Figure 2A:
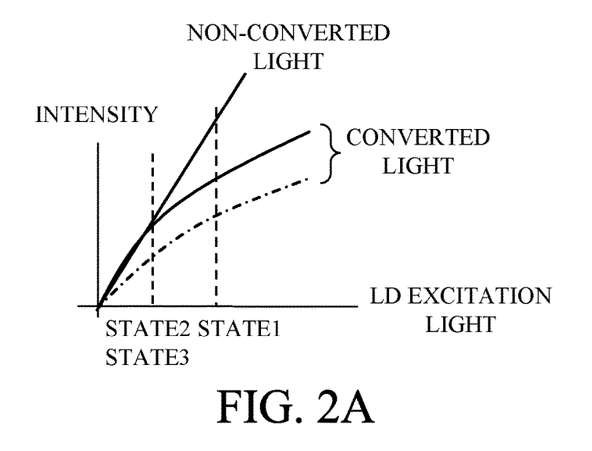
FIGS. 2A and 2B illustrate characteristics and evaluation results of the light source apparatus in Embodiment 1.
Figure 2B:
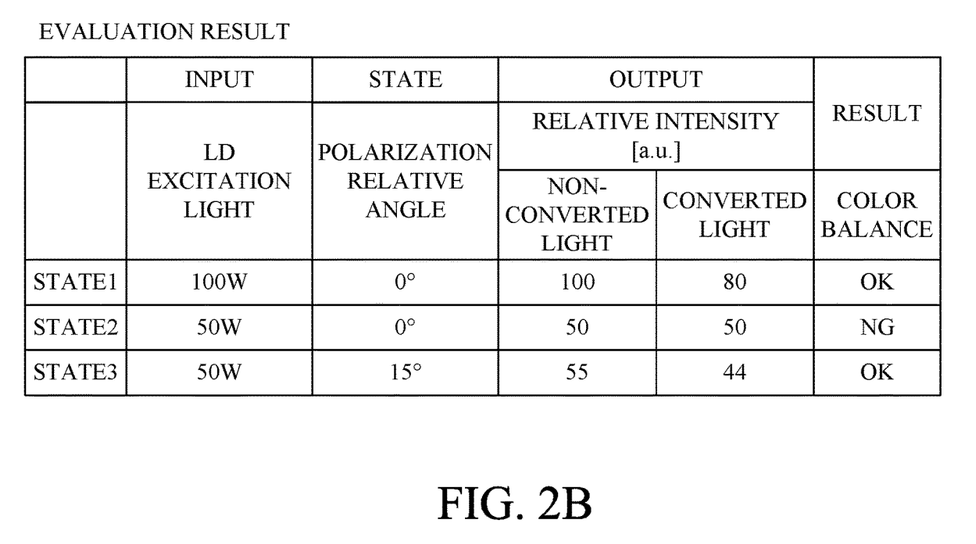

FIG. 2A schematically illustrates a relation between intensities of the converted light and the non-converted light (that is, a color balance of the white light) with respect to an intensity of the excitation light. FIG. 2B shows evaluation (experimentation) results at three rotation positions of the wavelength conversion element 70. This experimentation used, as the LD light source 10, blue LDs each emitting a blue light of a wavelength of 455 nm. As the wavelength conversion element 70, an element was used that is produced by putting a material which includes butyral resin and dispersed quantum rods on a glass substrate and spreading the material such that a linearly polarized light having a specific polarization direction is emitted from the wavelength conversion element 70. In the wavelength conversion element 70, it is not necessary that longitudinal directions of all the quantum rods are equal to one another, that is, the quantum rods may have variation in their longitudinal directions as long as a linearly polarized light having a specific polarization direction is emitted.

Moreover, in this experimentation, the glass plate had a circular disc shape and a gear portion at its outer periphery. The rotation mechanism 71 was constituted by a motor and an output gear provided on a rotation shaft of the motor. The wavelength conversion element 70 was rotated about the illumination optical axis 101$ax$ by transmitting rotation of the motor to the glass substrate via the output gear and the gear portion meshing with each other. Thus, the rotation position (direction) of the wavelength conversion element 70 was changed in an x-y plane orthogonal to the illumination optical axis 101$ax$.

In FIGS. 2A and 2B, State 1 is a state of setting the output of the LD light source 10 to 100 W and setting the polarization direction of the excitation light from the LD light source 10 to the x direction. In State 1, the rotation position of the wavelength conversion element 70 was set to one where the wavelength conversion element 70 has its maximum sensitivity (that is, its maximum conversion efficiency) with respect to the excitation light whose polarization direction is the x direction. A relative angle in State 1 formed between the polarization direction of the excitation light and the rotation position of the wavelength conversion element 70 was 0°. The relative angle is hereinafter referred to as "a polarization direction relative angle". Moreover, in State 1, with respect to the 100-W output of the LD light source 10, the intensity of the converted light from the wavelength conversion element 70 was 80 [a.u.], and the intensity of the non-converted light was 100 [a.u.]. The illumination optical system 100 was optically designed such that a reference white light (having a good color balance) is generated when a ratio of the intensity of the non-converted light and the intensity of the converted light is 100:80 (that is, 5:4).

State 2 is a state of setting the output of the LD light source 10 to 50 W and setting the polarization direction relative angle to 0° without change from State 1.

In State 2, due to the above-described conversion saturation phenomenon, the conversion efficiency of the wavelength conversion element 70 increased with respect to the 50-W output of the LD light source 10 lower than that in State 1, and thereby the intensity of the converted light from the wavelength conversion element 70 was 50 [a.u.], and the intensity of the non-converted light was 50 [a.u.]. In this state, the ratio of the intensity of the non-converted light and the intensity of the converted light shifted from 5:4 of the reference white light to 5:5. Thereby, the white light became yellowish (having no good color balance).

State 3 is a state of setting the output of the LD light source 10 to 50 W without change from State 2 and setting the polarization direction relative angle to 15° by rotating the wavelength conversion element 70. In State 3, the conversion efficiency of the wavelength conversion element 70 decreased, and thereby the intensity of the converted light from the wavelength conversion element 70 was 44 [a.u.], and the intensity of the non-converted light was 55 [a.u.]. That is, the ratio of the intensity of the non-converted light and the intensity of the converted light became 5:4, and thus the reference white light having the good color balance was obtained.

This embodiment enables, by using two constituent parts: the LD light source 10 and the wavelength conversion element 70 and by relatively rotating them, providing a desired white light regardless of change in output of the LD light source 10 and deterioration of the LD light source 10.

COMPARATIVE EXAMPLE 1

Description will be made of a light source unit as a first comparative example with respect to the embodiments with reference to FIGS. 8A to 8C.

Figure 8A:
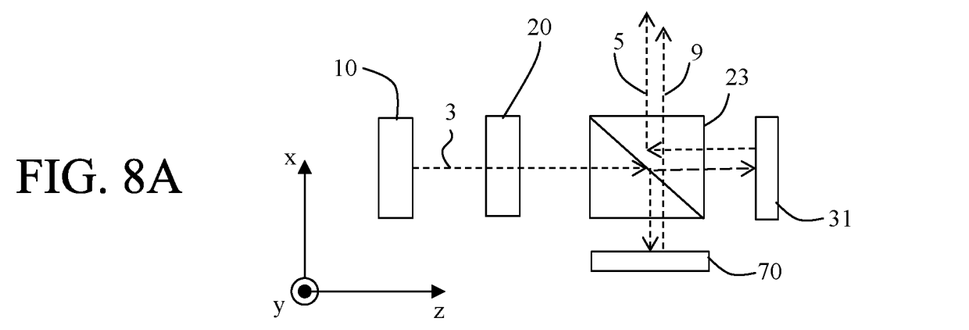
FIGS. 8A to 8C illustrate a configuration of a light source unit that is a comparative example.

In FIG. 8A, an excitation light 3 from an LD light source 10 passes through a half-wave plate 20, and then a part of the excitation light 3 is reflected by a polarization beam splitter 23 to enter a reflective wavelength conversion element 70. A converted light 9 from the wavelength conversion element 70 is transmitted through the polarization beam splitter 23 to exit from the light source unit. On the other hand, a non-converted light 5 exits from the light source unit through another optical path than that of the excitation light entering the wavelength conversion element 70. That is, the non-converted light 5, which is a transmitted part of the excitation light 3 from the polarization beam splitter 23, is reflected and diffused by a reflective diffuser 31, and is further reflected by the polarization beam splitter 23 to exit from the light source unit. In this configuration, it is necessary to control, by rotating the half-wave plate 20 so as to rotate the polarization direction of the excitation light 3 in an x-y plane, a balance of the converted light 9 that exits from the wavelength conversion element 70 and the non-converted light 5 that does not pass through the wavelength conversion element 70. This configuration includes five parts, which is more than two parts in Embodiment 1.

Figure 8B:
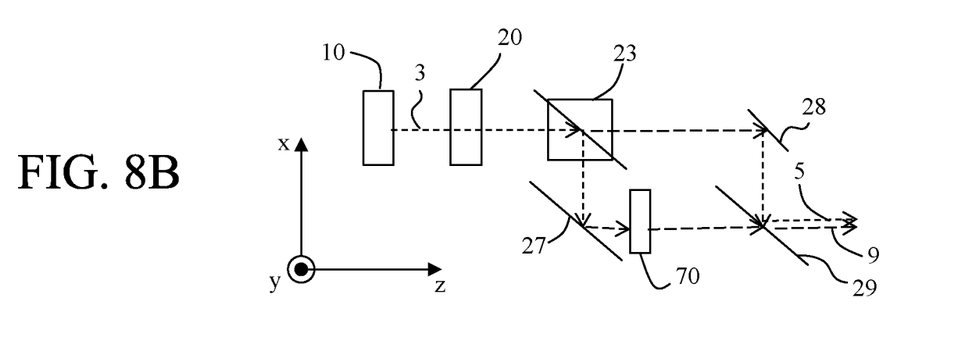

In FIG. 8B, an excitation light 3 from an LD light source 10 passes through a half-wave plate 20, and then enters a polarization beam splitter 23. A part of the excitation light 3 is reflected by the polarization beam splitter 23, and is further reflected by a reflective mirror 27 to enter a transmissive wavelength conversion element 70. A converted light 9 from the wavelength conversion element 70 is transmitted through a combining mirror 29. On the other hand, after the excitation light 3 passes through the half-wave plate 20, a non-converted light 5, which is a transmitted part of the excitation light 3 from the polarization beam splitter 23, is reflected by a reflective mirror 28, and is further reflected by the combining mirror 29 to be combined with the converted light 9. The combined light exits from the light source unit. Also in this configuration, it is necessary to control, by rotating the half-wave plate 20 so as to rotate the polarization direction of the excitation light 3 in the x-y plane, the balance of the converted light 9 that exits from the wavelength conversion element 70 and the non-converted light 5 that does not pass through the wavelength conversion element 70. This configuration includes seven parts, which is more than two parts in Embodiment 1.

Figure 8C:
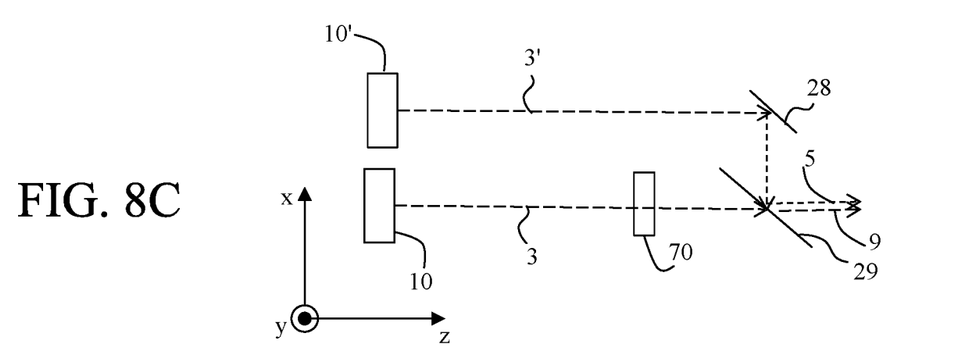

In FIG. 8C, an excitation light 3 emitted from an LD light source 10 that is one of two LD light sources 10 and 10' enters a transmissive wavelength conversion element 70. A converted light 9 from the wavelength conversion element 70 is transmitted through a combining mirror 29. On the other hand, an excitation light 3' emitted from the other LD light source 10' is reflected by a reflective mirror 28, and is further reflected by the combining mirror 29 to be combined with the converted light 9. The combined light exits from the light source unit. This configuration can eliminate the polarization beam splitter 23, the half-wave plate 20 and the reflective mirror 27 illustrated in FIG. 8B. However, this configuration uses the additional LD light source 10', and thereby includes five parts, which is more than two parts in Embodiment 1.

COMPARATIVE EXAMPLE 2

Description will be made of a light source unit as a second comparative example including a non-rotatable wavelength conversion element, which is different from Embodiment 1, and thereby its conversion efficiency is uncontrollable. In this light source unit, when output of the LD light source is changed, the color of the white light changes due to an influence of the conversion saturation phenomenon. However, the color change cannot be corrected.

[Embodiment 2]

Figure 3A:
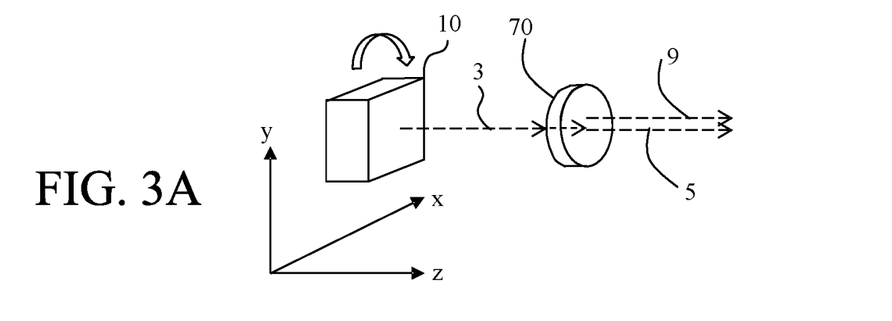
FIGS. 3A to 3C illustrate a configuration of a light source unit that is Embodiment 2 of the present invention.

FIG. 3A illustrates a configuration of a light source unit that is a second embodiment (Embodiment 2). In FIG. 3A, constituent elements identical to those in FIGS. 1A to 1C and 7 are denoted by the same reference numerals as those in FIGS. 1A to 1C and 7. Embodiment 1 includes the rotation mechanism 71 that rotates the wavelength conversion element 70. On the other hand, Embodiment 2 includes a rotation mechanism (not illustrated) that rotates an LD light source 10 with respect to a wavelength conversion element 70 such that a polarization direction of an excitation light 3 emitted from LD light source 10 is changed. The light source unit of this embodiment also emits a white light including a converted light 9 and a non-converted light 5 exiting from the wavelength conversion element 70.

Figure 3B:
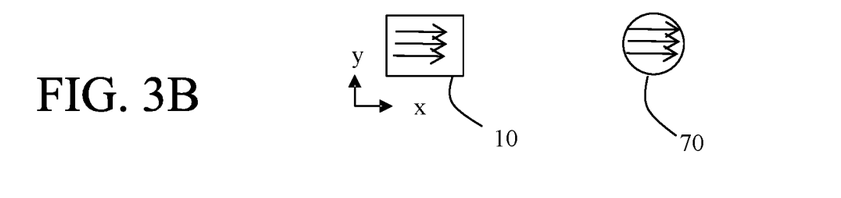

The LD light source 10 illustrated in FIG. 3B is set to a rotation position where the polarization direction of the excitation light 3 is a horizontal direction (x direction), that is, the same direction as a longitudinal direction of quantum rods in the wavelength conversion element 70. This state corresponds to State 1 (and State 2) that has been described in Embodiment 1 and where the wavelength conversion element 70 has a high conversion efficiency.

Figure 3C:
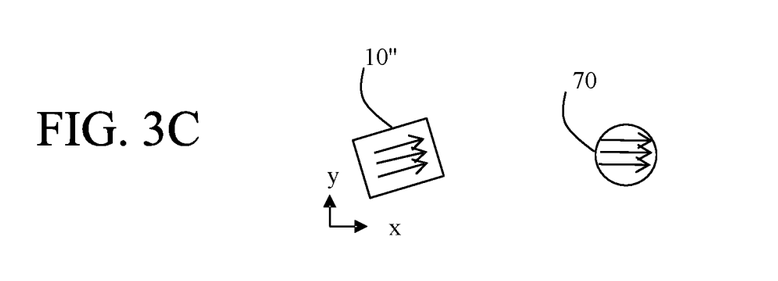

FIG. 3C illustrates the LD light source 10 set at a rotation position (illustrated by 10") where the polarization direction of the excitation light 3 is inclined relative to the x direction. This state corresponds to State 3 that has been described in Embodiment 1 and where the wavelength conversion element 70 has a decreased conversion efficiency as compared with the rotation position of FIG. 3B.

When output of the LD light source 10 is changed due to the above-described conversion saturation phenomenon or deterioration of the LD light source 10, the LD light source 10 is rotated by the rotation mechanism from the rotation position of FIG. 1B to that of FIG. 1C (or another rotation position not illustrated). The rotation of the wavelength conversion element 70 makes it possible to change the conversion efficiency of the wavelength conversion element 70 and thereby to control a balance of amounts of the converted light 9 and the non-converted light from the wavelength conversion element 70 (that is, color of the white light). In addition, in this embodiment, even when the LD light source 10 is rotated, the polarization direction of the excitation light 3 does not change, so that a design freedom of the illumination unit 100 and the color separation optical system 200 illustrated in FIG. 7 can be increased, which facilitates designing the illumination unit 100 and the color separation optical system 200.

[Embodiment 3]

Figure 4:
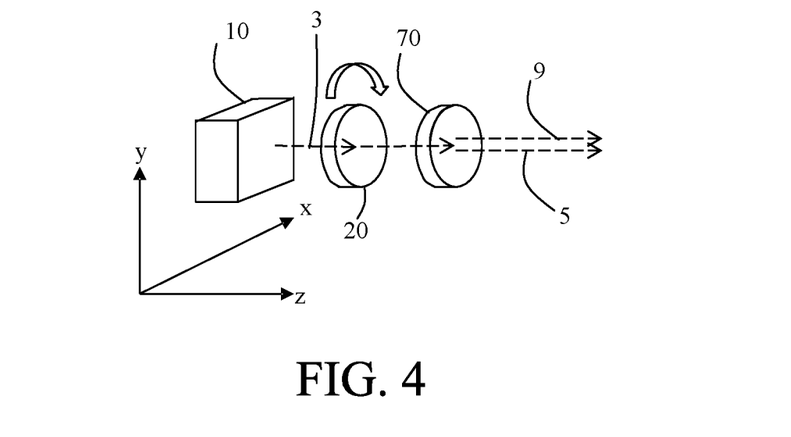
FIG. 4 illustrates a configuration of a light source unit that is Embodiment 3 of the present invention.

FIG. 4 illustrates a configuration of a light source unit that is a third embodiment (Embodiment 3). In FIG. 4, constituent elements identical to those in FIGS. 1A to 1C and 7 are denoted by the same reference numerals as those in FIGS. 1A to 1C and 7. Embodiments 1 and 2 include the rotation mechanism that rotates the wavelength conversion element 70 or the LD light source 10. On the other hand, Embodiment 3 includes a half-wave plate 20 disposed between an LD light source 10 and a wavelength conversion element 70, and includes a rotation mechanism (not illustrated) that rotates the half-wave plate 20 with respect to the LD light source 10 and the wavelength conversion element 70 such that a polarization direction of an excitation light 3 exiting from the half-wave plate 20 is changed. The light source unit of this embodiment also emits a white light including a converted light 9 and a non-converted light 5 exiting from the wavelength conversion element 70.

When output of the LD light source 10 is changed due to the above-described conversion saturation phenomenon or deterioration of the LD light source 10, the half-wave plate 20 is rotated by the rotation mechanism. The rotation of the wavelength conversion element 70 makes it possible to change the conversion efficiency of the wavelength conversion element 70 and thereby to control a balance of amounts of the converted light 9 and the non-converted light from the wavelength conversion element 70 (that is, color of the white light). In addition, in this embodiment, since the LD light source 10 and the wavelength conversion element 70 are not rotated, the polarization direction of the converted light 9 from the wavelength conversion element 70 can be maintained constant. Moreover, since the LD light source 10 is larger in size than the half-wave plate 20, the rotation mechanism can be reduced in output and size.

[Embodiment 4]

Figure 5:
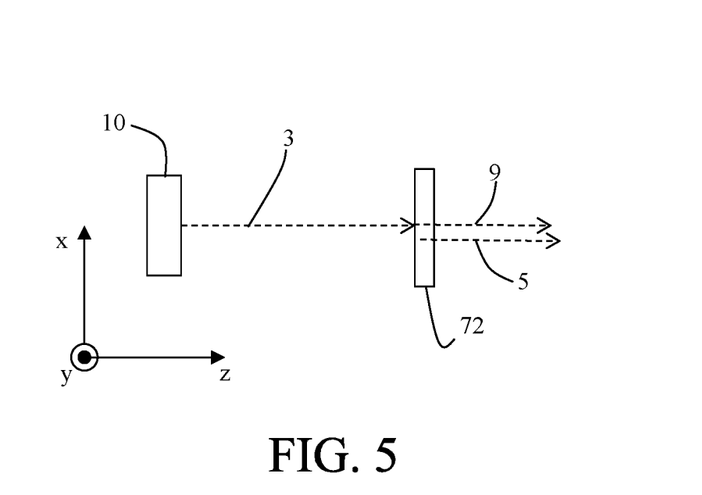
FIG. 5 illustrates a configuration of a light source unit that is Embodiment 4 of the present invention.

FIG. 5 illustrates a configuration of a light source unit that is a fourth embodiment (Embodiment 4). In FIG. 5, constituent elements identical to those in FIGS. 1A to 1C and 7 are denoted by the same reference numerals as those in FIGS. 1A to 1C and 7.

The light source unit of this embodiment includes, instead of the wavelength conversion element 70 described in Embodiment 1, a wavelength conversion element 72 including a quantum rod layer in which quantum rods and a light diffusive material are mixed together. That is, the quantum rod layer as a wavelength converting portion has light diffusing property. As the light diffusive material, $BaSO_4$ powder whose diameter is 1 μm is used, and this diffusive material is dispersed in the quantum rod layer.

This embodiment enables providing a spread angle to the non-converted light 5 not wavelength-converted by the quantum rods in the wavelength conversion element 72, which makes it possible to easily generate a uniform white light having reduced unevenness in color and brightness.

[Embodiment 5]

Figure 6:
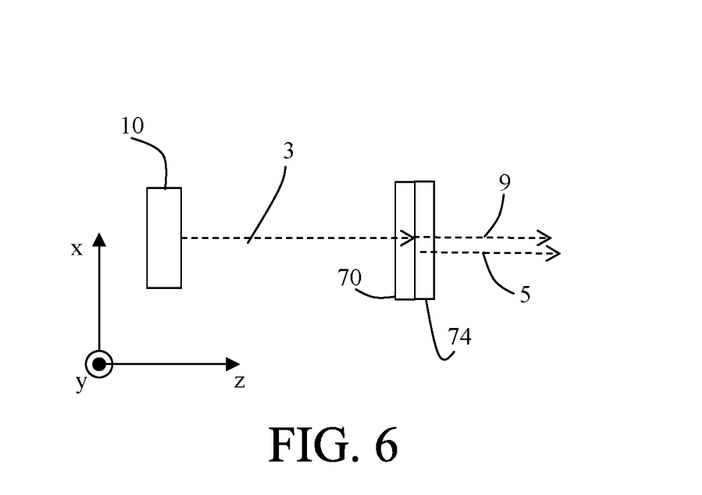
FIG. 6 illustrates a configuration of a light source unit that is Embodiment 5 of the present invention.

FIG. 6 illustrates a configuration of a light source unit that is a fifth embodiment (Embodiment 5). In FIG. 6, constituent elements identical to those in FIGS. 1A to 1C and 7 are denoted by the same reference numerals as those in FIGS. 1A to 1C and 7.

The light source unit of this embodiment includes a light diffusing layer (light diffusing portion) 74 contacting the same wavelength conversion element (quantum rod layer) 70 as that of Embodiment 1. For example, a film-like light diffusing layer 74 containing a light diffusive material whose thickness is tens of micrometers and a film-like wavelength conversion element 70 containing quantum rods are separately produced, and the film-like light diffusing layer 74 and the film-like wavelength conversion element 70 are joined together. A substrate may be provided as needed. The above production method eliminates a complicated process of mixing the diffusive material with the quantum rods.

This embodiment enables providing a converted light 9 and a non-converted light 5 each diffusing from an approximately same position as that of the quantum rod layer.

Each of the above-described embodiments enables controlling, with a small number of constituent parts, the balance of the amount of the second linearly polarized light, which is generated through the wavelength conversion of the first linearly polarized light by the wavelength conversion element, and the amount of the non-converted light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-070587, filed on Apr. 2, 2018, which is hereby incorporated by reference herein in its entirety.

What is claimed is:

1. A light source apparatus comprising:
   a light source;
   a wavelength conversion element containing quantum rods arranged so as to have directionality in a specific direction, the quantum rods being capable of converting a first linearly polarized light from the light source into a second linearly polarized light whose wavelength is different from that of the first linearly polarized light; and
   a changer configured to change a relative angle between the specific direction and a polarization direction of the first linearly polarized light entering the quantum rods.

2. The light source apparatus according to claim 1, wherein the changer is configured to rotate at least one of the light source and the wavelength conversion element with respect to the other thereof.

3. The light source apparatus according to claim 1, wherein:
   a half-wave plate is disposed between the light source and the wavelength conversion element; and
   the changer is configured to rotate at least one of the light source, the wavelength conversion element and the half-wave plate with respect to the others or other thereof.

4. The light source apparatus according to claim 1, wherein, in the wavelength conversion element, a wavelength converting portion containing the quantum rods has light diffusing property.

5. The light source apparatus according to claim 1, wherein the wavelength conversion element includes, separately from a wavelength converting portion containing the quantum rods, a light diffusing portion having light diffusing property.

6. An image projection apparatus comprising:
   (a) a light source apparatus including:
      a light source;
      a wavelength conversion element containing quantum rods arranged so as to have directionality in a specific direction, the quantum rods being capable of converting a first linearly polarized light from the light source into a second linearly polarized light whose wavelength is different from that of the first linearly polarized light; and a changer configured to change a relative angle between the specific direction and a polarization direction of the first linearly polarized light entering the quantum rods; and (b) an optical system configured to use the second linearly polarized light from the light source apparatus to project an image.

\* \* \* \* \*